United States Patent [19]

Nicol

[11] Patent Number: 4,932,632

[45] Date of Patent: Jun. 12, 1990

[54] ELECTROMAGNETIC VALVE

[75] Inventor: Stuart W. Nicol, London, England

[73] Assignee: Lucas Industries, United Kingdom

[21] Appl. No.: 433,967

[22] Filed: Nov. 8, 1989

[30] Foreign Application Priority Data

Dec. 2, 1988 [GB] United Kingdom ................ 8828160

[51] Int. Cl.[5] .............................................. F16K 31/06

[52] U.S. Cl. .......................... 251/129.02; 251/129.15; 251/129.19

[58] Field of Search ...................... 251/129.15, 129.02, 251/129.19

[56] References Cited

U.S. PATENT DOCUMENTS 2,612,907 10/1952 Harris ......................... 251/129.15 X 4,515,129 5/1985 Stettner ...................... 251/129.15 X

*Primary Examiner*—Arnold Rosenthal

*Attorney, Agent, or Firm*—Andrus, Sceales, Starke & Sawall

[57] ABSTRACT

A fluid control valve includes a plate like valve member movable between a pair of spaced seatings. The seating is formed about a drilling which extends through a valve plate. The valve plate has a further drilling extending therethrough and the two drillings are placed in communication when the valve member is lifted from the seating. The valve plate is located in a recess in a valve body and is urged towards the base wall by an insert. The face of the valve plate presented to the base wall defines two annular recesses, in which are located sealing rings which project into engagement with the base wall. The inner sealing ring forms a coupling space between the drilling and a first passage in the body and the annular space between the sealing rings forms a coupling space between the further drilling and a second passage in the body.

2 Claims, 2 Drawing Sheets

ELECTROMAGNETIC VALVE

This invention relates to an electromagnetically operable fluid control valve and has for its object to provide such a valve in a simple and convenient form.

According to the invention an electromagnetically operable fluid control valve comprises a valve body having a screw threaded recess formed therein, a retainer member engaged in the recess, a valve plate one face of which is engaged by the retainer member to urge the valve plate towards the base wall of the recess, a central drilling extending through the valve plate, an annular recess formed in the face of the valve plate presented to the retainer member so as to define a seating about said central drilling, a further drilling extending through the valve plate, said further drilling communicating with said recess, first and second annular grooves formed in the face of the valve plate presented to the base wall of the recess, seal rings located in said grooves and projecting therefrom, said seal rings being in sealing engagement with the base wall of the recess, the seal ring located in the first annular groove forming a coupling space between a first passage in the body and the central drilling and an annular coupling space formed between the seal rings effecting a connection between a second passage in the body and said further drilling, a valve member movable into engagement with said seating and a valve actuator stem slidable in a bore in said retainer member, said stem being movable by an electromagnetic actuator mounted on said retainer member.

Figure 1:
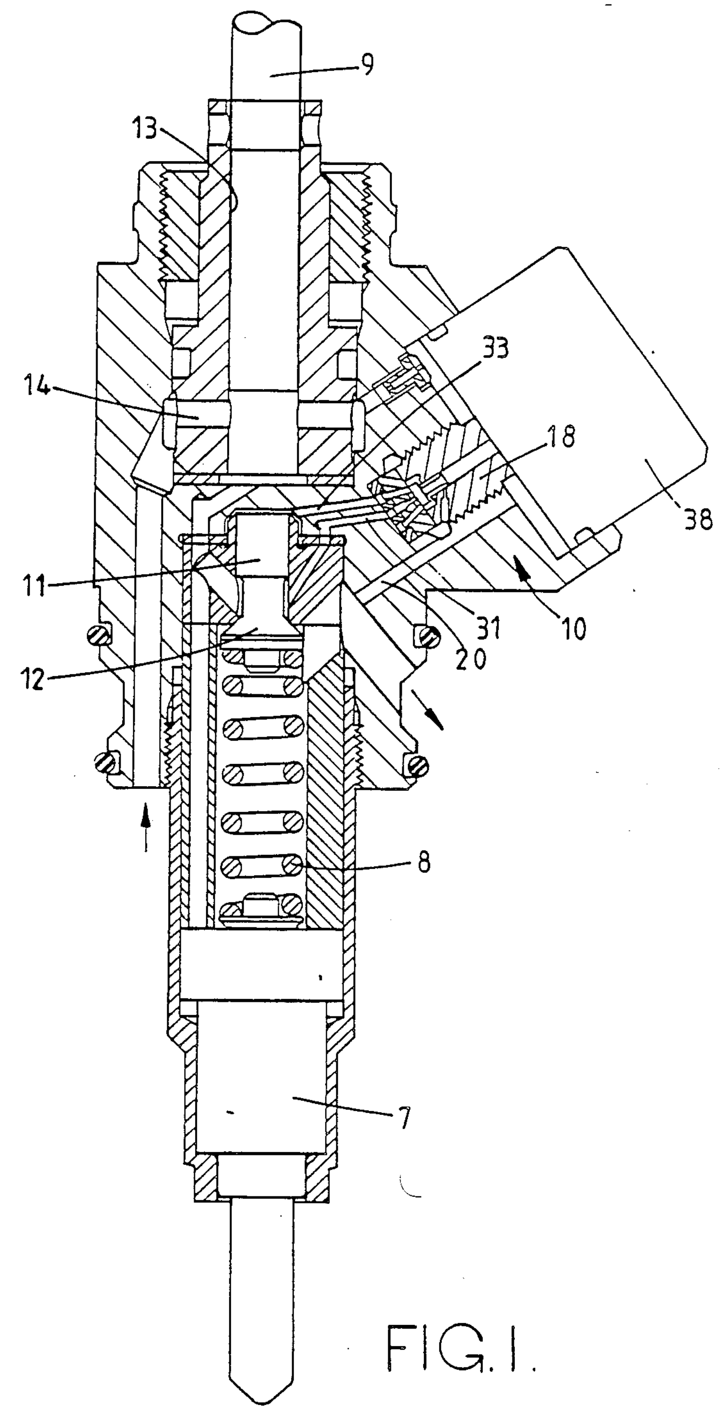
Figure 2:
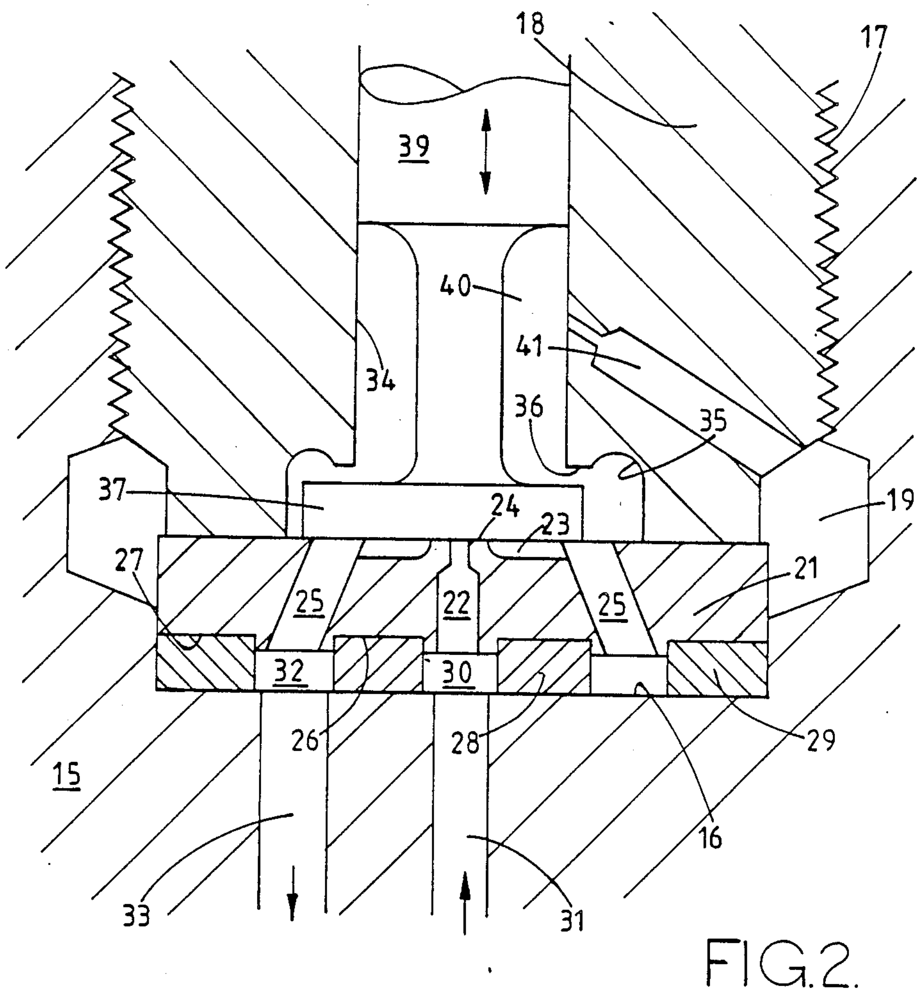
Figure 3:
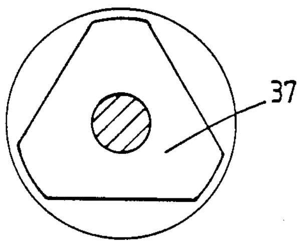

An example of a fluid control valve in accordance with the invention will now be described with reference to the accompanying drawings in which:

FIG. 1 is part sectional side elevation of a fuel injection nozzle which incorporates one example of a valve in accordance with the invention, FIG. 2 is a cross sectional view to an enlarged scale of the valve, and FIG. 3 is a plan view of part of the valve seen in FIG. 2.

Referring to the drawings, a control valve indicated at 10 is utilised to control the application of fuel under pressure to a piston member 11 of a spill valve 12 of a pump/injector intended to supply fuel to a combustion chamber of a compression ignition engine. The pump-/injector includes a plunger 9 which is mounted in a bore 13, the plunger being driven inwardly by a cam driven by the associated engine and outwardly in the usual manner by a return spring. The fuel displaced by the plunger when the latter covers filling ports 14, is passed to a fuel injection nozzle 7 and the amount of fuel supplied through the nozzle to the engine is controlled by arranging that at some point during the inward movement of the plunger the spill valve 12 is opened. The opening of the spill valve is effected by applying fuel under pressure to the piston member 11, the fuel under pressure being that which is delivered by the pumping plunger to the fuel injection nozzle. The control valve 10 must therefore be capable of controlling the high pressure of fuel developed during the inward movement of the plunger and when the valve is in the closed position, the piston member 11 should be subjected to a low pressure to ensure that the head 12 remains in contact with its seating under the action of a spring 8 which also serves to load the valve member of the nozzle to the closed position.

In FIG. 2, there is indicated a valve body 15 which in the particular example, forms part of the body of the pump/injector. Formed in the body 15 is a recess having a base wall 16 and a side wall 17 which is screw threaded.

Engaged within the recess is a retainer member 18 the inner portion of the retainer member together with a portion of the side wall of the recess being cut away to form an annular chamber 19 which communicates with a drain passage 20 which may be connected to a low pressure source of fuel.

Interposed between the retainer member 18 and the base wall 16 of the recess is a valve plate 21 in which there is formed a central drilling 22 extending between the opposite end faces of the valve plate. In the face of the valve plate which is presented to the retainer member there is formed an annular recess 23 so that about the central drilling there is formed a seating 24. Moreover, further drillings 25 extend through the valve plate, the drillings communicating with the recess 23 and opening onto the face of the valve plate which is presented to the base wall of the recess. The drillings 22 and 25 open on raised portions of the face of the valve plate presented to the base wall of the recess by reason of the fact that there is formed in the aforesaid face of the valve plate first and second annular grooves 26, 27 which accomodate annular preferably metallic seal rings 28, 29 respectively. The seal rings project beyond the end face of the valve plate into sealing engagement with the base wall 16 of the recess and the seal ring 28 forms a coupling space 30 between the drilling 22 and a first passage 31 in the body. The passage 31 communicates with a passage in the fuel injector which conveys the high pressure fuel from the bore 13 to the fuel injection nozzle 15. Between the seal rings 28, 29 there is defined an annular coupling space 32 which connects the passages 25 with a second passage 33 in the body, the passage 33 being connected to the end of the cylinder which accomodates the piston portion 11 of the spill valve 12.

The retainer member 18 is provided with a central bore 34 and the end face of the retainer member presented to the valve plate is recessed at 35 so as to define a further annular seating 36 which is spaced from the valve plate.

Also provided is a valve member 37 of plate like form and which as shown in FIG. 3, is of generally triangular shape. The valve member is located within the recess formed in the end surface of the retainer member and can be urged into contact with the seating 24 by an electromagnetic actuator shown in outline at 38 in FIG. 1, the actuator having an armature coupled to an actuator stem 39 slidable within the bore 34. The stem 39 is of reduced diameter at its end adjacent the valve member and the latter can be formed integrally with the stem. The reduced portion of the actuator stem results in an annular chamber 40 beneath the valve member, the chamber communicating by way of a restricted passage 41, with the annular space 19. The apices of the valve member can engage with the valve plate 21 to prevent tilting of the valve member particularly when the valve member is separate from the stem 39.

In operation, when the actuator is energised the valve member is held in engagement with the seating 24 so as to prevent fuel under pressure being applied to the piston member. In this position and as shown in FIG. 2, the passages 25 due to the triangular nature of the valve member, communicate with the space 40 and therefore with the space 19 by way of the restricted passage 41. The passage 33 therefore is connected to the low pressure source or drain so that substantially no pressure is applied to the end face of the piston member 11 of the spill valve 12. When during the inward movement of the plunger of the pump injector, the electromagnetic actuator is de-energised, the pressure of fuel will urge the valve member 37 away from the seating 24 and fuel under pressure will flow through the central drilling 22 into the drillings 25 so that fuel pressure will be applied to the end face of the piston member 11.

As the valve member moves away from the seating 24, towards the seating 36 a flow of fuel will occur through the passage 41 but since this is a restricted passage there will be an increase in the fuel pressure sufficient to cause movement of the piston member. The valve member will continue its movement into engagement with the seating 36 whereupon the flow of fuel through the passage 41 will cease and the full pressure available will be applied to the end face of the piston member. The fact that the passage 41 is restricted keeps to a minimum the quantity of fuel which flows through the passage to the space 19.

What is claimed:

1. An electromagnetically operable fluid control valve comprising a valve body having a screw threaded recess formed therein, a retainer member engaged in the recess, a valve plate one face of which is engaged by the retainer member to urge the valve plate towards the base wall of the recess, a central drilling extending through the valve plate, an annular recess formed in the face of the valve plate presented to the retainer member so as to define a seating about said drilling, a further drilling extending through the valve plate said further drilling communicating with said recess, first and second annular grooves formed in the face of the valve plate presented to the base wall of the recess, seal rings located in said grooves respectively and projecting therefrom, said seal rings being in sealing engagement with the base wall of the recess, the seal ring located in the first annular groove forming a coupling space between a first passage in the body and the central drilling, and an annular coupling space formed between the seal rings effecting a connection between a second passage in the body and said further drilling, a valve member movable into engagement with said seating and a valve actuator stem slidable in a bore in said retainer member, said stem being movable by an electromagnetic actuator mounted on said retainer member.

2. A control valve according to claim 1 characterized in that said retainer member defines a further seating presented to but spaced from said valve plate, an annular space defined between said actuator stem and the wall of the bore, and a restricted passage extending from said annular space and connected with a drain, said annular space in the closed position of the valve member communicating with said further drillings, said communication being broken by engagement of the valve member with the further seating in the open position of the valve member.

* * * * *